(12) United States Patent
Sütö et al.

(10) Patent No.: US 7,969,849 B2
(45) Date of Patent: Jun. 28, 2011

(54) METHOD OF READING A FOURIER HOLOGRAM RECORDED ON A HOLOGRAPHIC STORAGE MEDIUM AND A HOLOGRAPHIC STORAGE SYSTEM

(75) Inventors: Attila Sütö, Kartal (HU); Gábor Erdei, Budapest (HU)

(73) Assignee: Bayer Innovation GmbH, Duesseldorf (DE)

( * ) Notice: Subject to any disclaimer, the term of this patent is extended or adjusted under 35 U.S.C. 154(b) by 90 days.

(21) Appl. No.: 12/526,013

(22) PCT Filed: Jan. 24, 2008

(86) PCT No.: PCT/EP2008/000517
§ 371 (c)(1),
(2), (4) Date: Sep. 25, 2009

(87) PCT Pub. No.: WO2008/095608
PCT Pub. Date: Aug. 14, 2008

(65) Prior Publication Data
US 2010/0103796 A1    Apr. 29, 2010

(30) Foreign Application Priority Data
Feb. 6, 2007  (HU) .................................. 0700131

(51) Int. Cl.
*G11B 7/00*    (2006.01)

(52) U.S. Cl. .................................... 369/103; 369/44.11

(58) Field of Classification Search .................. None
See application file for complete search history.

(56) References Cited

U.S. PATENT DOCUMENTS 7,116,626 B1    10/2006 Woods et al.
2004/0212859 A1*  10/2004 Tsukagoshi .................... 359/15
(Continued)

FOREIGN PATENT DOCUMENTS

EP    1 492 095 A2    12/2004
(Continued)

OTHER PUBLICATIONS

International Search Report of PCT/EP2008/000517, dated Mar. 28, 2008 (3 pages).
(Continued)

*Primary Examiner* — Paul Huber
(74) *Attorney, Agent, or Firm* — Baker Donelson Bearman, Caldwell & Berkowitz, PC

(57) ABSTRACT

The invention relates to a method for reading a Fourier hologram recorded on a holographic storage medium with a holographic storage system. The method comprises the steps of: —calculating a characteristic value from a detected image of a reconstructed Fourier hologram in at least two relative positions of a reference beam and said storage medium, each of the characteristic values being indicative of a misalignment of the reference beam and said storage medium at the respective relative position, —calculating a servo value from the measured characteristic values, —determining an aligned relative position of said reference beam and said storage medium by means of a predetermined servo function using the calculated servo value, —setting the relative position of the reference beam and said storage medium to said aligned relative position, and—detecting an image at said aligned relative position. The invention also relates to a holographic storage system for reading a Fourier hologram recorded on a holographic storage medium, said system comprising reference beam generating means, storage medium receiving means and a detector for detecting a reconstructed hologram. The system further comprises a servo control unit for executing the method according to the invention.

25 Claims, 5 Drawing Sheets

U.S. PATENT DOCUMENTS

2006/0133249 A1* 6/2006 Kogure .................. 369/53.19
2006/0181999 A1* 8/2006 Knittel et al. ............... 369/103
2008/0008076 A1 1/2008 Raguin et al.

FOREIGN PATENT DOCUMENTS

| EP | 1492095 | 12/2004 |
|---|---|---|
| WO | 02/05270 A1 | 1/2002 |
| WO | 2005/103842 A2 | 11/2005 |

OTHER PUBLICATIONS

Lorincz et al., "New results in holographic data storage with organic polymer films," in Organic Holographic Materials and Applications II, edited by Klaus Merholz, Proceedings of SPIE (2004) vol. 5521, Bellingham, WA.

Suto et al., "Optimisation of data density in Fourier holographic system using spatial filtering and sparse modulation coding," in Optik 115, (2004) No. 12, 541-546.

* cited by examiner

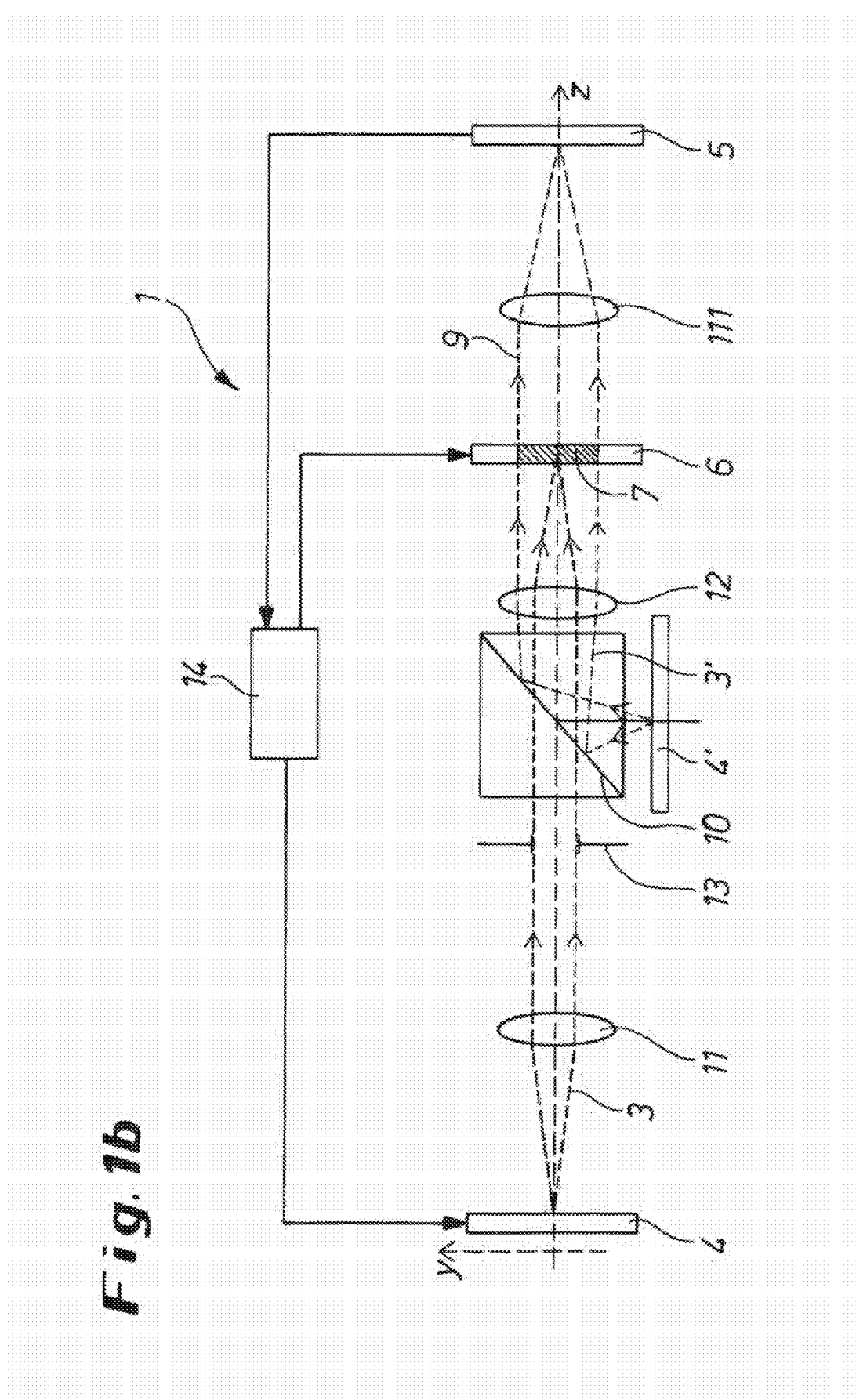

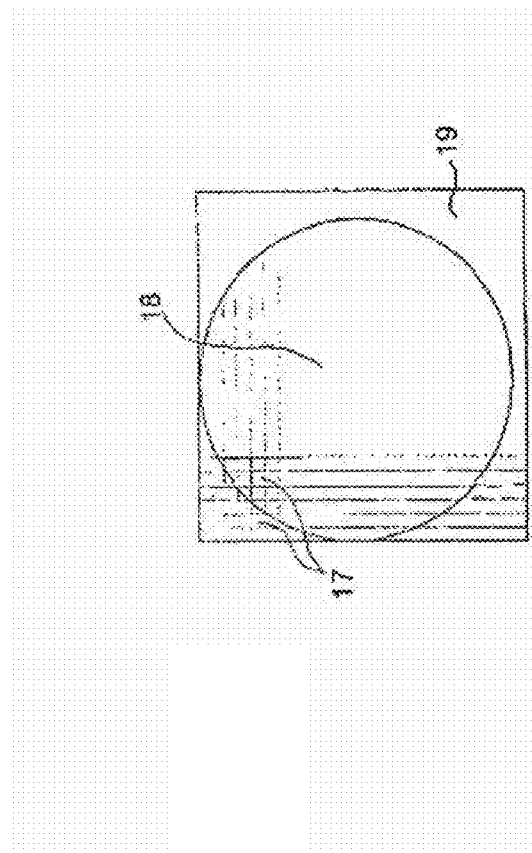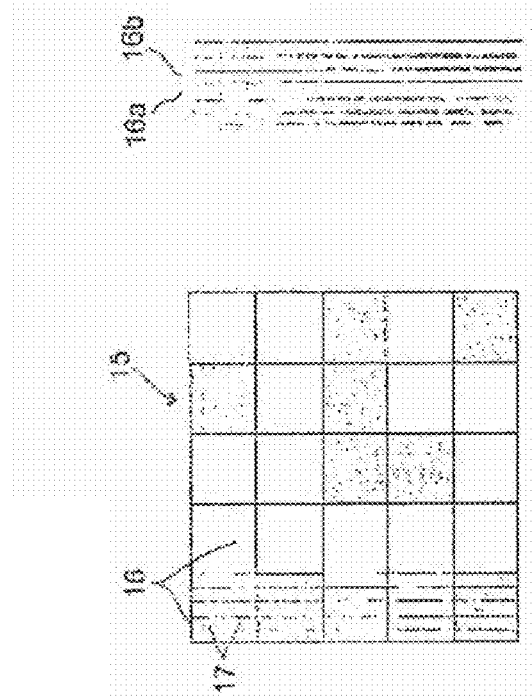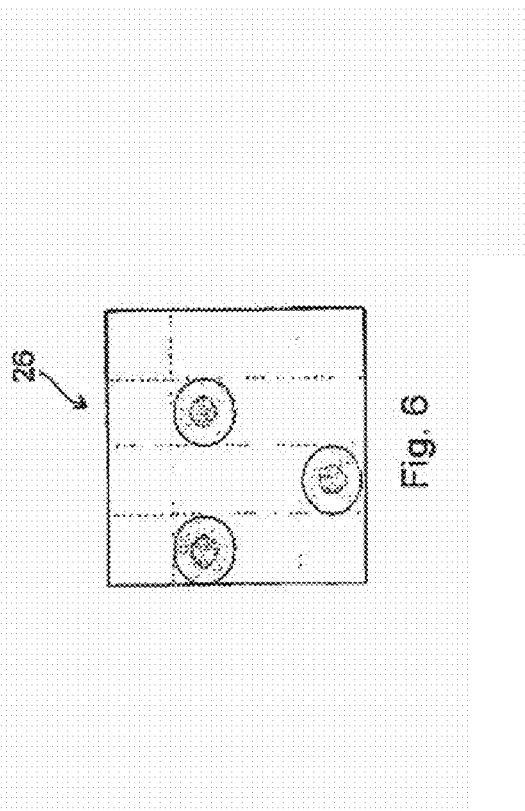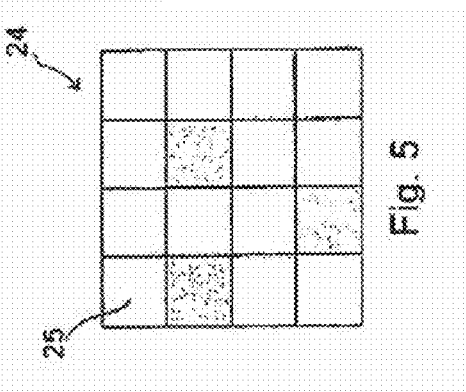

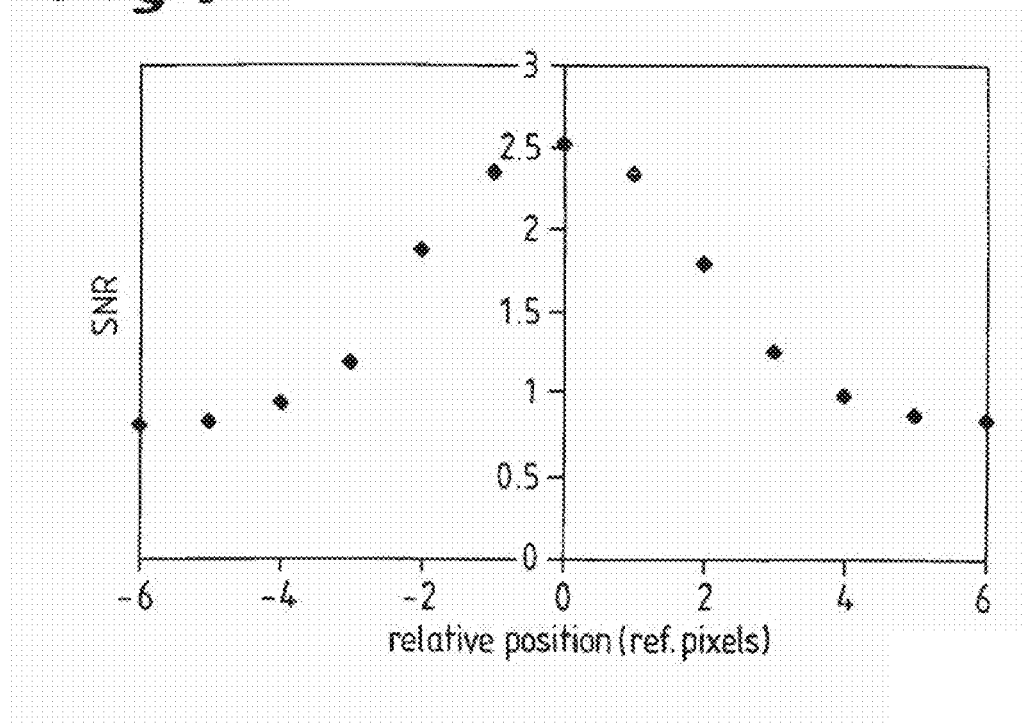

METHOD OF READING A FOURIER HOLOGRAM RECORDED ON A HOLOGRAPHIC STORAGE MEDIUM AND A HOLOGRAPHIC STORAGE SYSTEM

CROSS REFERENCE TO RELATED APPLICATIONS

This application is a §371 National Stage Application of PCT/EP2008/000517 filed Jan. 24, 2008 which claims priority from Hungarian Application P 07 00131 filed Feb. 6, 2007.

BACKGROUND OF THE INVENTION

1. Field of the Invention

The present invention is directed to a system for reading Fourier holograms, in particular to a method of reading a Fourier hologram recorded on a holographic storage medium and to a holographic storage system.

Holographic data storage is based on the concept of recording the interference pattern of a data-encoded signal beam (also referred to as an object beam) carrying the data and of a reference beam at a holographic storage medium. Generally a spatial light modulator (SLM) is used for creating the object beam and the holographic storage medium can be for example a photopolymer or photorefractive crystal or any other material which is suitable for recording the relative amplitudes of, and phase differences between the object beam and the reference beam. After a hologram is created in the storage medium, projecting the reference beam into the storage medium interacts and reconstructs the original data-encoded object beam, which can be detected by a detector such as a CCD-array camera or the like. The reconstructed data-encoded object beam is generally referred to in the art as the reconstructed hologram itself. According to this terminology reconstruction of a hologram means the reconstruction of the original data-encoded object beam; and reading of the hologram means detecting the reconstructed hologram, in particular an image of the reconstructed hologram. This terminology is adapted in the present specification.

2. Description of Related Art

The writing of holograms is greatly influenced by the spatial overlap of the object beam and the reference beam, while hologram reading is strongly affected by the relative position of the reconstructing reference beam and the hologram stored in the storage medium. Reading of a holographic storage medium can be relatively easily achieved if both the reference beam and the object beam cover a relatively large spot on the surface of the storage medium. The tolerance of displacement between the centre of the hologram and the centre of the reference beam is approximately 10% of the size of the beam diameter, which is usually within the mechanical limits of conventional systems. However, decreasing the hologram size leads to a higher demand on alignment of the reference beam and the hologram when reading the medium. High-precision alignment can also be necessary for example, in case of multiplexing and/or security encrypting the stored holographic data.

There are many known methods of multiplexing and/or encrypting holograms. Such methods may involve phase coding the object beam and/or the reference beam both in the real and/or in the Fourier-plane. A method of, and device for, phase coded multiplexing and encrypting by phase coding the reference beam is disclosed in WO 02/05270 A1. When applying phase coded multiplexing or encrypting the tolerance of displacement between the centre of the reference beam and the hologram during reconstruction of the hologram can drop to 1% of the beam diameter. Misalignment of the beam and the hologram is generally associated with the misalignment of the optical components of the system, which can be due to mechanical shocks, temperature changes, etc. It is also a common problem of systems designed to receive removable storage medium, such as holographic identification cards.

U.S. Pat. No. 7,116,626 B1 teaches a micro-positioning method to overcome the above identified problem of misalignment. The object of the described method is to increase the performance of a holographic storage system, i.e., the quality of the modulated image, by ensuring the correct alignment of various components of the system such as an SLM with various devices, such as light sources, lenses, detectors, and the storage medium. The alignment technique focuses on "pixel matching" that is aligning the pixels of an SLM, the stored holographic image and the detector so that each pixel of the SLM is projected onto a single pixel of the detector resulting in better data recovering efficiency. The method involves physically moving all or some of said components and a servomechanism is suggested to control the positioning of the components based on feedback associated with a misalignment derived from the detected image.

Various exemplary methods are described for determining the misalignment of the detected images. In one example, the misalignment is based on the measurement of a channel metric associated with the detected image. The channel metric is generally a scalar quantity indicative of the pixel misalignment, e.g. average pixel intensity or SNR. Channel metrics indicate the magnitude or degree of misalignment but not the direction of the misalignment. Consequently, in order to minimise pixel registration errors at least one component of the system needs to be moved and the channel metric has to be recalculated at the new component position. It may take a large number of steps to find the optimal position of the components with respect to each other, which can be very time consuming.

In another example, the misalignment is based on the measurement of a page metric associated with the detected image. Page metrics generally include reference pixels, i.e. known pixel patterns or registration marks, such as blocks of pixels located within the user encoded data or in border regions around the user encoded data. The known pixel patterns may be detected and used to determine misalignments of various components of the holographic storage system. The drawback of this solution is that the holograms have to be provided with the reference pixel blocks, which occupy precious data space if too large and are difficult to locate in the image if too small. The reference pixel blocks serve for calculating the point spread function (PSF) of the system, which is a key information used by known servo methods responsible for aligning the components of the system. However it would be desirable to have servo methods which do not require the PSF of the system.

SUMMARY OF THE INVENTION

The object of the invention is to provide a simple way of detecting misalignment of components of a holographic data storage system without the need of applying reference pixel blocks or having to reposition the components repeatedly.

This object is achieved by the method according to claim 1 and the holographic storage system according to claim 25.

Further details of the invention will be apparent from the accompanying figures and exemplary embodiments.

BRIEF DESCRIPTION OF THE DRAWINGS

FIG. 1b is a schematic view of another exemplary embodiment of a transmission type holographic storage system according to the invention.

FIG. 2 shows an exemplary reference beam code pattern generated by a spatial light modulator.

FIG. 3 illustrates the shifting of the reference beam code pattern by one SLM pixel.

FIG. 4 shows another exemplary reference beam code pattern generated by a spatial light modulator.

FIG. 5 shows an exemplary data code block using sparse modulation coding.

FIG. 6 shows the reconstructed data code block of the data code block depicted in FIG. 5.

FIG. 7 is a diagram of an exemplary SNR function plotted against the SLM pixel displacement.

DETAILED DESCRIPTION OF A PREFERRED EMBODIMENT

Figure 1A:
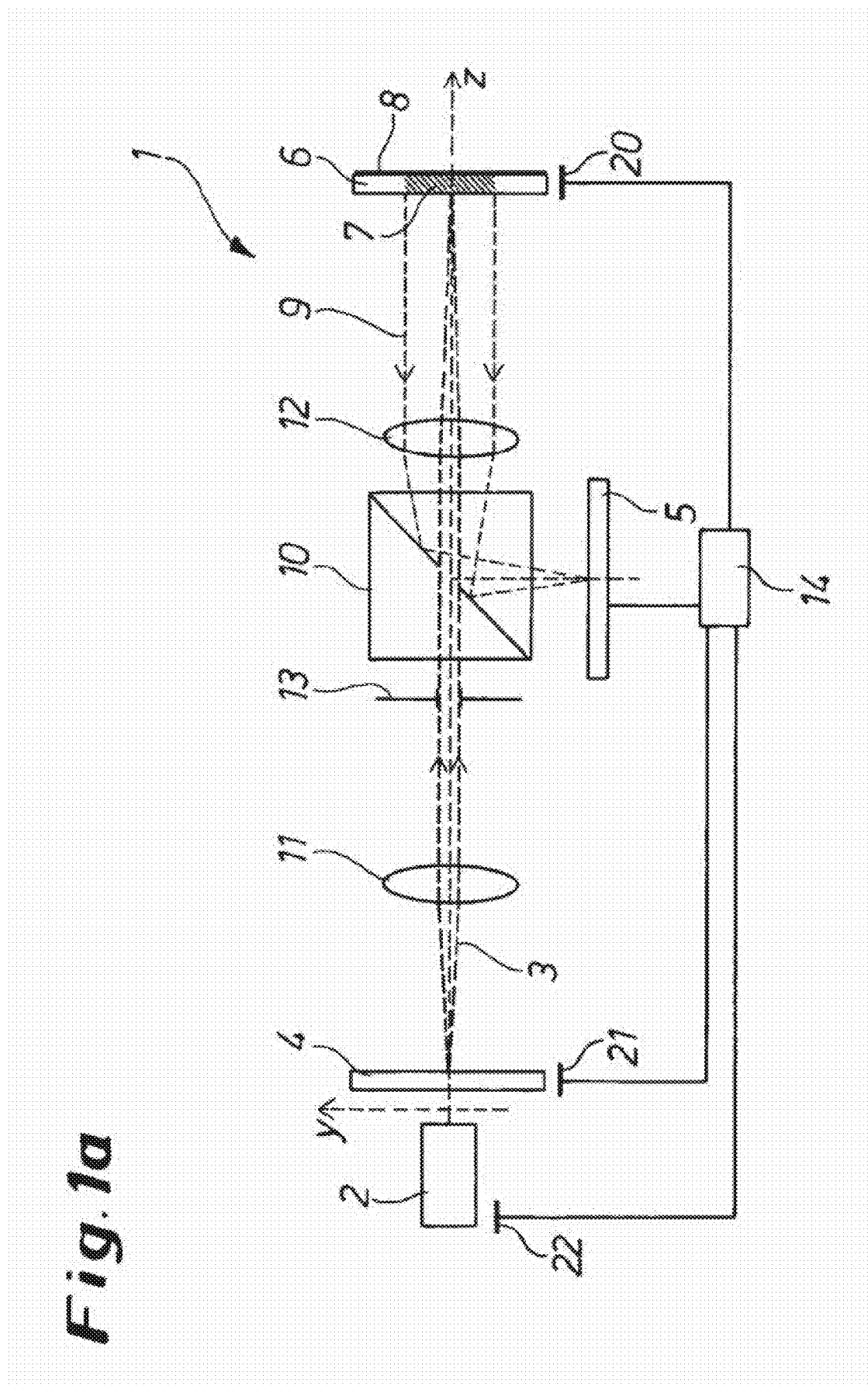
FIG. 1a is a schematic view of an exemplary embodiment of a reflection type holographic storage system according to the invention.

FIG. 1a is a schematic view showing a first exemplary embodiment of a holographic storage system 1 according to the invention. The system 1 comprises a light source 2 providing a reference beam 3. The light source 2 generally consists of a laser and a beam expander. In a preferred embodiment the light source 2 is followed by a spatial light modulator (SLM) 4 encoding the reference beam 3. The system 1 further comprises a detector 5 and means (not shown) for receiving a holographic storage medium 6 carrying a hologram 7. The detector 5 can be a CCD camera, a CMOS, a photodiode matrix or any other known detector type comprising sensor elements arranged in a pixel array.

The hologram 7 is a Fourier-hologram, due to its smaller sensitivity to surface defects of the storage medium than that of image plane holograms. In case of a Fourier hologram, the phase code pattern displayed by the SLM 4, used for phase-coding the reference beam 3, is imaged onto the Fourier-transform of an object beam when creating the hologram 7. Because of its good diffraction efficiency and low wavelength selectivity, e.g. a thin polarisation hologram can be used as the hologram 7. Suitable holographic storage mediums are e.g. azo-benzene type photoanizotropic polymers.

This embodiment is designed for reading the holographic storage medium 6 in reflection mode: the reference beam 3 is reflected from a mirror 8 behind the medium 6 and the reconstructed object beam 9 is inverse Fourier transformed onto the imaging plane of the detector 5 for capturing an image of the reconstructed hologram 7. The reflected beam 9 and the reference beam 3 are separated from each other by a beam splitter 10, which can be a neutral beam splitter or a polarisation beam splitter in case of polarisation holograms, or any other beam separation elements such as a beam splitter cube with a central layer discontinuity, as disclosed in EP 1 492 095 A2.

The encoded reference beam 3 is generated with the SLM 4 and is imaged into the plane of the hologram 7 by an imaging system. This imaging system comprises preferably a first and second Fourier lenses 11 and 12, arranged before and after the beam splitter 10 as known in the art. Furthermore an aperture 13 can be interposed between the first Fourier lens 11 and the beam splitter 10 improving the imaging quality by limiting the diameter of the beam and providing the further advantage of restricting the definition of the SLM 4 as will be explained later on.

The reference beam encoding can be a phase coding, an amplitude coding, a polarisation coding or any other light modulation coding known in the art. In a preferred embodiment the reference beam encoding is phase coding to avoid information loss present at amplitude encoding. The phase code can be for example a security key for reading an encrypted hologram 7 or a key for reading a multiplexed hologram 7. However, the invention also relates to applications other than encryption or multiplexing. It is also applicable in all cases where a mechanical clearance cannot be excluded, leading to a certain uncertainty of the position of the inserted storage medium 6, thus the reference beam 3 and the storage medium 6 need to be repeatedly repositioned with respect to each other, especially if the storage medium 6 is often removed or a plurality of storage mediums 6 are to be read with the system 1.

In addition to reference beam phase encoding, the SLM 4 can also be used as an aperture creating an easy to position circular reference beam 3. This is useful to reduce inter-hologram cross-talk at hologram reconstruction when multiple holograms 7 are written close to each other into the storage medium 6.

If no reference beam encoding is applied, the SLM 4 can be completely omitted or it can be used as an aperture creating an easy to position circular reference beam 3.

FIG. 1b illustrates another preferred embodiment of the holographic storage system 1 according to the invention, which is adapted both for reading and writing holographic storage media 6. In this embodiment the storage medium 6 is read in transmission mode. Accordingly, the detector 5 is arranged on the opposite side of the storage medium 6 for detecting the reconstructed object beam 9 inverse Fourier transformed onto the imaging plane of the detector 5 by a third Fourier lens 111. In this case the beam splitter 10 is used to unite the reference beam 3 and an object beam 3' coming from an object beam SLM 4' when the system 1 is used for recording a hologram 7 on a storage medium 6. The object beam 3' can be provided by a separate light source (not shown), or the same light source 2 providing the reference beam 3 can be used to provide both beams 3 and 3' as known in the art.

The detector 5 is connected to a servo control unit 14, which is responsible for positioning the reference beam 3 and the storage medium 6 relative to each other. The servo control unit 14 analyses the image detected by the detector 5 and computes a servo signal as will be explained later. In a first embodiment the relative position of the reference beam 3 and the storage medium 6 can be changed by displaying a reference beam code pattern at different positions on the SLM 4. The servo signal is used for controlling the position of the code pattern displayed by the SLM 4. The servo control unit 14 can be for example a computer or an embedded system including digital signal processor (DSP) or filed programming gate array (FPGA) operating the SLM 4. FIG. 2 illustrates a reference beam code pattern 15 displayed on the SLM 4. The reference beam code pattern 15 is preferably a phase code pattern. As can be seen in this embodiment each reference beam code pixel 16 consists of 5×5 SLM pixels 17. The number of SLM pixels 17 used for displaying a single code pixel 16 can vary depending on the application. Using code pixels 16 consisting of more than one SLM pixel 17 allows for a simple way of shifting the code pattern 15. For example to shift the code pattern 15 by one SLM pixel 17 to the right, each code pixel 16*a* is shifted by one row of SLM pixels 17 as demonstrated in FIG. 3. The new code pixel 16*b* is displayed by a new block of 5×5 SLM pixels 17 consisting of 5×4 SLM pixels 17 overlapping with the original code pixel 16*a* and 1×4 SLM pixels 17 to the right from the original code pixel 16*a*. The code pattern 15 can be shifted in any direction following the above concept, including directions not parallel with the rows or columns of the SLM pixels 17.

A hologram 7 recorded with a particular reference beam code pattern 15 can only be reconstructed with a reference beam code pattern 15 identical or highly similar to the one used for recording the hologram 7, thus encoding the reference beam 3 allows for security encryption or multiplexing. The reference beam code pattern 15 can for example have a size of 10×10 code pixels 16 leading to $2^{100}$ possible code combinations. However, for the purpose of security encryption and multiplexing, the hologram 7 should not be readable with reference beam code patterns 15 other than the one used for recording the hologram 7. Therefore, only a set of sufficiently distinct code patterns 15 should be used out of the total possible code patterns 15, which in practice is still a very high number, e.g. about $2^{25}$ code combinations could be used. A method of generating distinct code patterns 15 is disclosed in WO 02/05270.

Using the aperture 13 has the additional benefit of restricting the definition of the SLM 4, so that the individual SLM pixels 17 are not distinguishable on the image detected by the detector 5 while the encoding effect of the code pixels 16 is still perceptible. To avoid vignetting effects near the edges of SLM 4, the aperture 13 is arranged in the Fourier plane of the SLM 4 (or its close vicinity) in order to filter the high frequency components in the Fourier space thereby blurring the resulting image.

In applications where the SLM 4 is used as an aperture for creating an easy to position circular beam, the reference beam code pattern 15 can be a simple light transmitting inner circle 18 with a non-transparent outer border area 19 as illustrated in FIG. 4. This can be achieved for example by using the SLM 4 as an amplitude modulator and decreasing the amplitude of the border area 19 while maintaining the amplitude of the light within the transmitting circle 18 thus creating the easy to position circular reference beam 3. The circular reference beam 3 can be easily positioned by changing the amplitude modulation of the individual SLM pixels 17 so as to create the light transmitting inner circle 18 at another location of the SLM 4.

A known method to realise amplitude modulation mode is to provide a polariser before and an analyser after the SLM 4. The polarisation of the reference beam 3 falling within the inner circle 18 can be left unchanged by the SLM 4, while it can be rotated by 90 degrees within the outer border area 19. Only the unchanged polarisation will pass through the analyser thus creating the easy to position circular reference beam 3.

The easy to position circular reference beam 3 can be provided together with phase coding as well, either using the same or a further reference beam encoding SLM 4 disposed along the optical path of the reference beam 3. The same SLM can be used for simultaneous phase and amplitude modulation e.g. in ternary modulation mode of special SLMs. Using two SLMs for separate phase and amplitude modulation requires additional optical elements to image the two SLMs onto each other.

In a second embodiment the servo control unit 14 acts on one or more displacing means 20, 21, 22 (FIG. 1*a*) for mechanically displacing one or more components (the storage medium 6, the SLM 4 and the light source 2 respectively) of the system 1 with respect to each other. The displacing means 20, 21, 22 can include micro-actuators or other devices for physically displacing the components of the system 1. Similarly to the above described embodiment, the servo control unit 14 analyses the image detected by the detector 5 and computes a servo signal, which is used for controlling the displacing means 20, 21, 22 arranged to displace the storage medium 6, the SLM 4 and the light source 2, respectively. All three displacing means 20, 21, 22 may be present or only some of them. It is also possible to provide further optical or mechanical elements influencing the position of the incident reference beam 3 with respect to the storage medium 6. These can also be controlled by the servo control unit 14. A further possibility lies in combining the first and second embodiments.

The hologram 7 can contain one data page or more data pages in case of multiplexed holograms. These data pages are preferably composed of a plurality of data code blocks 24. An exemplary data code block 24 is shown in FIG. 5. The data code block 24 consists of 4×4 data code pixels 25, each representing a binary variable ("on" or "off"). Although there are $2^{16}$ possible patterns only a fraction of these are used for coding the units of information (e.g. letters, numbers, symbols, etc.) stored on the hologram 7. It is normally sufficient to use a couple of hundred different data code blocks 24 for coding the information. For example a set of 256 data code blocks 24 can be used for coding the symbols of the ASCII code table.

The data code blocks 24 can be generated for example using constant weight modulation coding (ratio of the "on" and "off" data code pixels 25 being approx. 1:1), or sparse modulation coding (substantially lower ratio of "on" data code pixels 25, as illustrated in FIG. 5: 3 "on" data code pixels 25 and 13 "off" data code pixels 25). The set of data code blocks 24 is preferably generated by sparse modulation coding and the data code blocks 24 of the set are chosen to differ from each other as much as possible. A method for generating such a set of data code blocks 24 is known in the art. For example data encoding and decoding using data code blocks generated by modulation coding using a look-up table is described by A. Sütóó et al. (Optimisation of data density in Fourier holographic system using spatial light filtering and sparse modulation coding", Optik, International Journal for Light and Electron Optics, Vol. 115, 12, pp. 541-546, 2004). When reading the hologram 7, the servo control unit 14 compares some or all of the reconstructed data code blocks 26 (depicted in FIG. 6) detected by the detector with the elements of the set of data code blocks 24 used for writing the data page carried by the hologram 7, in order to decide which particular data code block 24 is being read. If the relative position of the reference beam 3 and the storage medium 6 as well as the reference beam encoding (if any) is the same as when the hologram 7 was recorded then each reconstructed code block 26 matches only one element of the set of data code blocks 24. However, if the reference beam 3 and the storage medium 6 are misaligned or the encoding of the reading reference beam 3 differs from that of the recording reference beam 3 then the reconstructed data code blocks 26 of the data page do not match any of the elements of the set of data code blocks 26 exactly yet can resemble more than one of them.

The servo control unit 14 calculates a characteristic value of the image detected by the detector 5 at a given relative position of the reference beam 3 and the storage medium 6. The characteristic value can be any appropriate quantified property of the image indicative of the misalignment of the reference beam 3 and the storage medium 6.

In a preferred embodiment the characteristic value is the signal to noise ratio (SNR) of a number of reconstructed data code blocks 26:

$$SNR = \frac{E(SNR_{block})}{E(SNR_{block}^2) - E(SNR_{block})^2} \quad (1)$$

where E is the expected value function and $SNR_{block}$ stands for the signal to noise ratio of a reconstructed data code block 26.

The $SNR_{block}$ can be calculated for all the reconstructed data code blocks 26 or for a certain number of reconstructed data code blocks 26. For example it is possible to select at least 100, preferably at least 300, even more preferably at least 600 reconstructed data code blocks 26 for calculating the above SNR value in case of a data page consisting of approximately 2000 data code blocks 24. The examined reconstructed data code blocks 26 can be taken from the same area in the detected image or they can be selected so as to represent important regions of the data page as will be apparent to a skilled person.

The signal to noise ratio of a reconstructed data code block 26 can be calculated in various ways, a preferred way of obtaining the $SNR_{block}$ is to calculate the ratio of the maximum and the average correlation value between the reconstructed data code block 26 and all the possible elements of the set of data code blocks 24:

$$SNR_{block} = \frac{\max_i(b_j * v_j^i)}{\text{average}_i(b_j * v_j^i)} \quad (2)$$

where
max(.) stands for the maximum of the argument taken over the index,
average(.) stands for the average of the argument taken over the index,
\* symbol stands for scalar product,
$b_j$ stands for the j-th component of the reconstructed data code block 26, which is an n×m dimensional vector in a general case and a 16 dimensional vector in the above-discussed particular case where the data code blocks 24 are 4×4 pixel arrays, and
$v_j^i$ stands for the j-th component of the i-th data code block 24 of the set of data code blocks 24, which is, similarly to $b_j$, a 16 dimensional vector in this particular case.
For example the i-th $v^i$ vector representing the data code block 24 shown in FIG. 5 is [0 0 0 0 1 0 1 0 0 0 0 0 1 0 0] the 5th component of which is $v^i_5=1$.

In another example $SNR_{block}$ is calculated as the difference between the maximum and the second highest correlation value between a reconstructed data code block 26 and all the possible data code blocks 24 of the set of data code blocks 24:

$$SNR_{block} = \max_i(b_j * v_j^i) - \max_{2\ i \neq k}(b_j * v_j^i) \quad (3)$$

where $\max_2(.)$ stands for the second highest maximum of the argument taken over the i index, and is obtained by omitting the k index found to give the maximum of the max(.) function. Many other possibilities are at hand for calculating SNR and $SNR_{block}$ as will be apparent to a skilled person.

Once the SNR value is obtained for a given relative position of the reference beam 3 and the storage medium 6 the servo control unit 14 decides whether this SNR value corresponds to an aligned state or a misaligned state of the reference beam 3 and the storage medium 6 with respect to each other and in case of a misalignment the servo unit 14 determines the aligned relative position of the reference beam 3 and the storage medium 6, giving a satisfactory image quality. Once the aligned relative position is determined the servo control unit 14 generates a servo signal for acting upon all or part of the components of the system 1 in order to set the relative position of the reference beam 3 and the storage medium to the aligned relative position by displacing all or part of the components physically and/or optically as previously described. Once the reference beam 3 and the storage medium 6 is at their aligned relative position an image having a satisfactory image quality can be detected or captured for further use.

In order to distinguish between an aligned state and a misaligned state and to determine the degree of misalignment the system 1 is calibrated in advance for a particular application. The calibration can be carried out using a reference beam 3 and a calibration hologram recorded on a storage medium 6, whereby the storage medium 6 carrying the calibration hologram is inserted into the same location where the storage medium 6 carrying the hologram 7 is to be read later on. Preferably, the reference beam 3 is encoded with a general reference beam code pattern 15 being representative for the set of reference beam code patterns 15 used for recording the hologram 7 and preferably the calibration hologram is a hologram that was recorded using an object beam 3' encoded with a data page representative of the elements of the set of data code blocks 24 used for encoding the information on the hologram 7. In certain applications one of a set of storage media 6 to be read can be used to provide the calibration hologram, or alternatively each storage medium 6 is used for calibration purpose as well in order to facilitate faster reading of the storage medium 6 in the future. This is particularly advantageous when the same system 1 is used for both writing and reading the holograms 7, for example the system 1 depicted in FIG. 1b. In this case the calibration can be performed after writing the hologram 7 and before first removing it from the system 1.

Furthermore, in applications where only a small number of reference beam code patterns 15 are used the calibration can be performed for all the possible applied reference beam code patterns 15. This can be the case for multiplexed holograms where only a small number of data pages are stored in the same hologram. Similarly, in applications where only a small number of data pages are possible the calibration can be performed for all the possible calibration holograms carrying these data pages.

It is understood that the one or more calibration holograms can coincide with the one or more holograms 7 to be reconstructed with the system 1.

In the first step of the calibration a characteristic function is obtained by plotting a number of characteristic values calculated for a number of relative positions of the reference beam 3 and the calibration hologram. The calibration value is calculated in the same or substantially the same way as will be calculated to identify the misalignment of the reference beam 3 and the storage medium 6 when reading the later.

In the above-discussed preferred embodiment the characteristic value is the SNR calculated from the $SNR_{block}$ of all or a certain number of the reconstructed data code blocks 26. Taking the embodiment where the relative position of the reference beam 3 and the hologram/calibration hologram is set by optically shifting the reference beam code pattern 15 displayed by the SLM 2, the SNR values obtained at the different relative positions can be plotted against the displacement of the code pattern 15 measured in SLM pixels 16. FIG. 7 shows an exemplary SNR function plotted against the SLM pixel displacement. The SNR function is substantially a symmetrical Gaussian curve generally regardless of the exact way of calculating the individual $SNR_{block}$ values and the exact number of reconstructed data code blocks 26 used provided this number is sufficiently high to give a representative sample for the data code blocks 24 of the data page. The SNR function illustrated in FIG. 7 was obtained using equation (2) for all the reconstructed data code blocks 26.

It should be noted that the origin of the ordinate can be set to correspond to the maximum SNR value, however this is not compulsory as the relative positions and a change in the relative positions can be described using an off-set too.

The SNR function plotted in FIG. 7 relates to a 1-dimensional positioning problem. For example the storage medium 6 can be incorporated in a credit card or an identification card, which, when inserted into the holographic storage system 1 is held tightly along the direction of two perpendicular axis, while it can be displaced along a third perpendicular axis corresponding to the line of insertion. In this case the relative position of the storage medium 6 and the reference beam 3 can only vary along the third axis, leading to a 1-dimensional positioning problem. If the position of the inserted storage medium 6 can vary along the first and second axis as well, then the positioning needs to be performed in two and three dimensions respectively. The positioning of the storage medium 6 with respect to the reference beam 3 along more than one axis can be carried out by subsequently changing the relative position of the storage medium 6 and the reference beam 3 along all the axis in order to find the aligned relative position along each axis subsequently. The relative position of the storage medium 6 and the reference beam 3 can only be changed along two axis by shifting the reference beam code pattern 15 of the SLM 4. For 3-dimensional positioning shifting of the code pattern 15 can be combined with physically displacing the storage medium along the optical axis or by shifting the focus of the system 1. Alternatively, a two- or three-variable SNR function can be obtained. Only the 1-dimensional positioning will be discussed in further detail, the 2- and 3-dimensional cases being a simple extension of the 1-dimensional positioning.

After having obtained the SNR function the second step of the calibration is to derive a servo function therefrom, which is also performed by the servo control unit 14.

Figure 8:
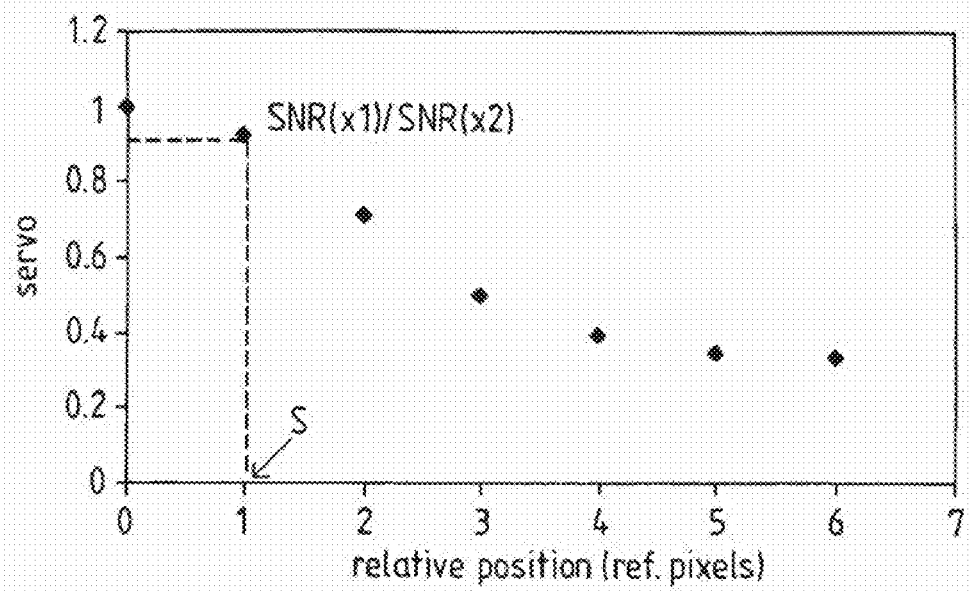
FIG. 8 is a diagram of an exemplary servo function.
Figure 9:
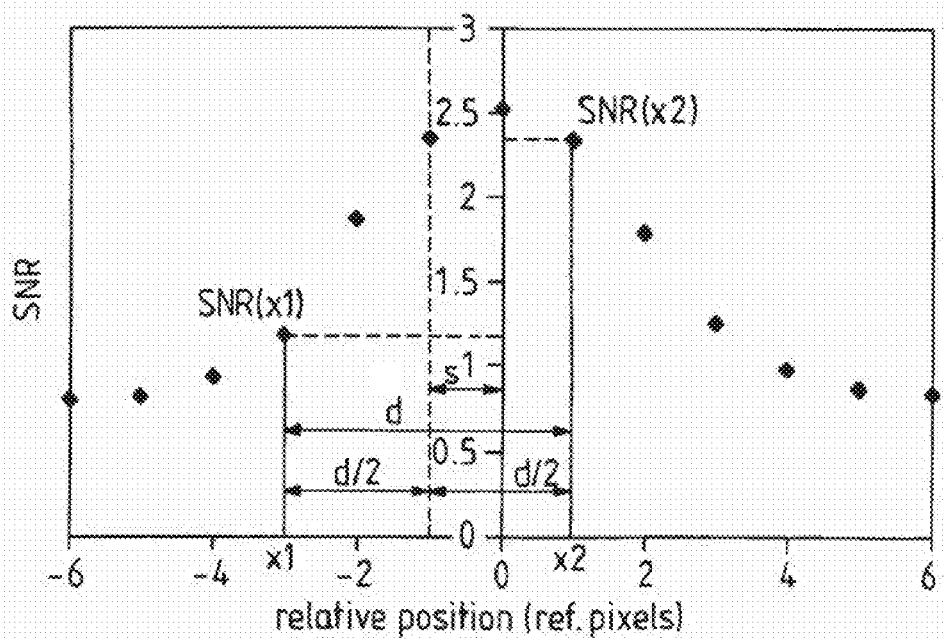
FIG. 9 is an annotated diagram of the SNR function in FIG. 7 illustrating how the servo function in FIG. 8 is obtained.

A preferred servo function is obtained by taking pairs of SNR values at two relative positions x1 and x2 of the reference beam 3 and the calibration hologram stored on a storage medium 6. Relative positions x1 and x2 are such that the difference between the distance of the reference beam 3 and the calibration hologram in relative position x1 and x2 is d. For example if the positioning is carried out by shifting the reference beam code pattern 15 relative position x1 and x2 correspond to two locations of the code pattern 15 on the SLM 4 and d is the distance between the two positions (preferably measured in number of SLM pixels 17). The smaller SNR value is then divided by the higher one, thus the result for each relative position pair falls between 0 and 1. The results are plotted against a displacement s of the mid-point between relative positions x1 and x2 with respect to the origin. In the above example displacement s would be the code pattern position half way between the first and second code pattern positions (i.e. relative positions x1 and x2). The servo function is depicted in FIG. 8 and FIG. 9 illustrates how it is obtained. For the sake of simplicity the zero relative position of the reference beam 7 and the calibration hologram (i.e. the origin) is assumed to coincide with the aligned state corresponding to the maximum SNR. However the servo function can be calculated with an offset too as will be apparent to a skilled person.

In the example illustrated in FIGS. 8 and 9 the SNR function is a Gaussian distribution centred on the abscissa, while the servo function is a decreasing function with its maximum value 1 (corresponding to $SNR(x1)=SNR(x2)$) at s=0 displacement.

It is to be noted that the servo function can be constructed in a number of different ways the only condition being that the servo function be invertible. In the context of the present invention an invertible servo function is a function allowing for deriving the magnitude and direction (i.e. the algebraic sign) of a displacement s from any function value. For example an invertible servo function can be obtained by integrating the SNR function between a first relative position x1 and a second relative position x2 the difference of distances between the reference beam 3 and the calibration hologram being d for the two relative positions x1 and x2 and plotting the obtained servo values against x1 (instead of s).

The positioning of the reference beam 3 with respect to the storage medium 6 for the purpose of reading the hologram 7 stored on the storage medium 6 is performed as follows when using the above-explained preferred servo function.

The SNR value is calculated by the servo control unit 14 at a first relative position x1 of the reference beam 3 and the storage medium 6. Then a second relative position x2 is set between the reference beam 3 and the storage medium 6, the first and second relative positions x1 and x2 defining the difference d as introduced above. Consequently a second SNR value is calculated at the second relative position x2. The smaller SNR value is divided by the higher one. The result is used to determine the aligned relative position giving the highest SNR value, i.e. the aligned position of the reference beam 3 and the storage medium 6. When positioning the reference beam 3 and the hologram 7 the dashed abscissa in FIG. 9 would be the expected origin, i.e. the expected aligned relative position (believing the expected aligned relative position to be the midpoint of the two relative positions x1 and x2). If the expected aligned relative position corresponds to the actual aligned relative position then $SNR(x1)=SNR(x2)$ as explained previously. If there is a displacement s between the expected and the actual aligned relative positions then the quotient of the two SNR values differs from 1. The displacement s can be obtained from the previously recorded servo function by taking the inverse of the servo function at SNR (x1)/SNR(x2) as indicated in FIG. 8. Considering which of the two SNR values was used as the divisor the algebraic sign of the displacement s can be easily determined too. The relative position of the reference beam 3 and the storage medium 6 is then set to correspond to the aligned relative position by using the obtained displacement s.

In particular the above positioning can be carried out by performing the following steps:
1) calculating the SNR value at a first location of the reference beam pattern 14 on the SLM 4 corresponding to the first relative position x1,
2) shifting the code pattern 14 by d number of SLM pixels 17 on the SLM 4 in order to obtain a second relative position x2, 3) calculating the SNR value at the second relative position x2,
4) dividing the smaller SNR value (SNR(x1)) by the higher SNR value (SNR(x2)),
5) deriving the displacement s from the servo function value SNR(x1)/SNR(x2),
6) shifting the code pattern 14 by
   (d/2+s) number of SLM pixels 17 starting from the first relative position x1 if SNR(x1)<SNR(x2)
   (d/2−s) number of SLM pixels 17 starting from the first relative position x1 if SNR(x1)>SNR(x2)
   to obtain the aligned relative position, and
7) reading the hologram 7 at the aligned relative position.

In order to improve the accuracy of the positioning the above steps can be repeated for other pairs of first and second relative positions corresponding to code patterns 14 displayed at d number of SLM pixels 17 from each other and an average can be calculated from the aligned relative positions obtained for each pair, thus eliminating possible errors.

The above-described embodiments are intended only as illustrating examples and are not to be considered as limiting the invention. Various modifications will be apparent to a person skilled in the art without departing from the scope of protection determined by the attached claims.

The invention claimed is:

1. A method for reading a Fourier hologram recorded on a holographic storage medium with a holographic storage system, the method comprising
   a. calculating a characteristic value from a detected image of a reconstructed Fourier hologram in at least two relative positions of a reference beam and said storage medium, each of the characteristic values being indicative of a misalignment of the reference beam and said storage medium at the respective relative position,
   b. calculating a servo value from the measured characteristic values,
   c. determining an aligned relative position of said reference beam and said storage medium by means of a predetermined servo function using the calculated servo value,
   d. setting the relative position of the reference beam and said storage medium to said aligned relative position, and
   e. detecting an image at said aligned relative position.

2. The method according to claim 1, wherein the predetermined servo function is generated by means of a calibration procedure comprising
   obtaining a characteristic function by changing a relative position of the reference beam and a calibration hologram with respect to each other, the calibration hologram being a Fourier hologram, and calculating a characteristic value of a detected image of the reconstructed calibration hologram at each relative positions indicative of a misalignment of said reference beam and said calibration hologram at the respective relative position, and
   calculating an invertible servo function from said characteristic function to be used as the predetermined servo function.

3. The method according to claim 1, wherein said Fourier hologram to be read comprises a plurality of data code blocks, each data code block being one of a set of data code blocks.

4. The method according to claim 3, wherein each data code block of said set of data code blocks is a n×m pixel array having a unique pattern.

5. The method according to claim 3, wherein said set of data code blocks is obtained by modulation coding using a look-up table.

6. The method according to claim 3, wherein said calibration hologram comprises a plurality of data code blocks, each data code block being one of said set of data code blocks.

7. The method according to claim 3, wherein said Fourier hologram to be read and said calibration hologram are phase-coded holograms recorded using a spatial light modulator (SLM) for creating a phase-coded object beam.

8. The method according to claim 3, wherein the characteristic function is a signal to noise ratio (SNR) function calculated as $$SNR = \frac{E(SNR_{block})}{E(SNR_{block}^2) - E(SNR_{block})^2}$$

where E is the expected value function and $SNR_{block}$ stands for the signal to noise ratio of a data code block.

9. The method according to claim 8, wherein $SNR_{block}$ is calculated for all the data code blocks.

10. The method according to claim 9, wherein $SNR_{block}$ is calculated for least 5% of all the data code blocks.

11. The method according to claim 8, wherein $SNR_{block}$ is calculated as the ratio of the maximum and the average correlation value of a reconstructed data code block and all the data code blocks of said set of data code blocks.

12. The method according to claim 8, wherein $SNR_{block}$ is calculated as the difference between the highest and the second highest correlation value of a reconstructed data code block and all the possible data code blocks of said predetermined set of data code blocks.

13. The method according to claim 2, wherein
   when generating said predetermined servo function, a plurality of servo values are calculated from the characteristic function each calculated servo value being indicative of a ratio of two characteristic values of two relative positions having a pre-given difference between the distance of the first reference beam and the calibration hologram, the variable of the servo function being the midpoint between the two relative positions; and
   when reading said Fourier hologram the servo value is calculated from a ratio of two characteristic values that are calculated at two relative positions having said pre-given difference between the distance of the reference beam and the hologram to be read.

14. The method according to claim 2, wherein said reference beam is encoded by a reference beam code.

15. The method according to claim 14, wherein said reference beam code is one of a set of reference beam codes.

16. The method according to claim 15, wherein the reference beam code used for the calibration is an element of said set of reference beam codes.

17. The method according to claim 15, wherein the reference beam code used for reading said Fourier hologram is identical to the reference beam code used for the calibration.

18. The method according to claim 15, wherein the calibration is performed for all the reference beam codes of said set of reference beam codes, and selecting the predetermined servo function obtained for a given reference beam code when reading said Fourier hologram.

19. The method according to claim 14, further including generating the reference beam code when reading said Fourier hologram from additional information provided to said system.

20. The method according to claim 19, wherein said additional information is a code provided by a user.

21. The method according to claim 14, wherein the reference beam is encoded by a spatial light modulator (SLM).

22. The method according to claim 21, wherein changing said relative position of said reference beam and said Fourier hologram is carried out by displaying the reference beam code at different locations on said SLM.

23. The method according to claim 21, wherein the reference beams are encoded by a phase, amplitude and/or polarisation modulation code pattern.

24. The method according to claim 2, further comprising recording the Fourier hologram to be read on said holographic storage medium with said system and subsequently performing the calibration before removing said storage medium.

25. A holographic storage system for reading a Fourier hologram recorded on a holographic storage medium, said system comprising reference beam generating means, storage medium receiving means and a detector for detecting a reconstructed hologram, wherein said system further comprises a servo control unit capable of executing the method according to claim 1.

* * * * *